United States Patent

[11] 3,599,288

| | | |
|---|---|---|
| [72] | Inventor | Stephen L. Eakman<br>Framingham, Mass. |
| [21] | Appl. No. | 793,341 |
| [22] | Filed | Jan. 23, 1969 |
| [45] | Patented | Aug. 17, 1971 |
| [73] | Assignee | Laboratory for Electronics, Inc.<br>Waltham, Mass. |

[54] SCAN AVERAGE MEMORY CONTROL SYSTEM
2 Claims, 5 Drawing Figs.

[52] U.S. Cl. .................................................. 18/2 HA,
264/40
[51] Int. Cl. .................................................. B29d 7/14
[50] Field of Search ........................................ 264/40;
18/21, 21 HA; 72/16

[56] References Cited
UNITED STATES PATENTS
3,006,225 10/1961 Mamas ........................... 72/12
3,307,215 3/1967 Gerhard et al. ................. 18/21

*Primary Examiner*—J. Spencer Overholser
*Assistant Examiner*—Norman E. Lehrer
*Attorney*—Kenway, Jenney & Hildreth ABSTRACT: A process control system for controlling the adjustments in spacing between calender rolls to adjust the thickness of a process material sheet. A sensing head is scanned transversely across the material sheet producing a profile scan of the thickness of the material and this signal is used to compute the average deviation of thickness from a target value for three transverse zones, the left edge, the center, and the right edge. At the completion of a scan the relative values of these three signals are compared to one another and control signals for both edge corrections and crown correction are developed which take into consideration the interaction between adjustments at each edge and in the center. Each correction is undertaken only with a full set of values across the width of the strip.

INVENTOR.
STEPHEN L. EAKMAN
ATTORNEYS

INVENTOR.
STEPHEN L. EAKMAN

BY Kenway, Jenney & Hildreth
ATTORNEYS

SCAN AVERAGE MEMORY CONTROL SYSTEM

FIELD OF THE INVENTION

This invention relates in general to automatic process control systems and more particularly to an apparatus for controlling a calendering process to produce sheet materials within prescribed tolerances of thickness and flatness.

BACKGROUND OF THE INVENTION

The application of measurement and automatic control techniques for the control of manufacturing processes has now become a sophisticated art. In general, such process controls involve sensing devices for measuring the value of a variable of the process, control elements for controlling the value of this variable and a signal processing or computing system for generating from the output of the sensing device control signals for operating the control element to maintain the variable within the prescribed limits of a target value.

In the production of sheet materials, such as plastic or rubber, control systems employing nuclear radiation gauges as the sensing element have proven highly successful. Such systems include a source of radiation positioned on one side of the sheet and a nuclear detector positioned opposite to it on the other side of the sheet. Variations in the thickness of the material passing between the source and the detector result in variations of the output signal from the detector and it is this signal which is used as the basis for controlling the process. In general the variables being controlled in such sheet material production are the thickness of the material sheet and the flatness across its width. In most calendering processes, the basic thickness control consists of screw-down motors at the ends of the calender rolls, which motors control the vertical spacing between the rolls. Some calenders may have hydraulic control actuators. With separately adjustable screw-down motors at either end of the calender rolls, the thickness at each edge of the sheet may be adjusted.

Two different types of systems have been employed for adjusting the flatness of the sheet across its width. One such system is referred to as roll-bending control. In this system the flatness or crown of the sheet material is adjusted by applying axial force to one of the rolls, thereby bending it and varying the thickness in the center portion of the material sheet. A second system which has been used is referred to as cross axis control and consists of pivoting one of the calender rolls horizontally about its center which results in varying the gap between the rolls at the edges.

There are a number of problems which complicate the design of the control system for such a calendering process. Some of these problems apply to roll coating systems as well. One problem arises from the interrelated nature of the adjustment, that is that an adjustment in one edge control results in a change in the sheet, not only at the adjusted edge but also to some degree at the other edge and at the center, since the roll-bearing supports are some distance beyond the edge of the roll. More fundamentally, the cross axis adjustment changes the flatness by first adjusting the thickness at the edges and hence requires a compensating change in the edge adjustments in order to maintain a specific thickness of the sheet and a resultant change in crown. Additional problems arise from the pass line delay between the nip of the calender rolls and the point at which the thicknesses are measured. A measurement which indicates that the material has exceeded the tolerance limits for a specific desired thickness should result in a control signal to adjust the calender roll nip to compensate for this departure. The effect of an adjustment in the nip will not, however, be realized at the measuring heads until sufficient time has elapsed for the material affected to pass downstream from the calender rolls to the measuring position. In the servo loop which includes the measuring sensors and the control elements, this pass line delay must be taken into account in order to prevent over corrections. Other complicating factors involve compensation for backlash and the requirement for providing an output display of the thickness profile across the material sheet.

Averaging systems and systems which provide for proportional controls including pass line delays and backlash compensation are described in U.S. Pat. Nos. 3,010,018, 3,024,404, 3,067,939 and 3,191,015.

One typical configuration of a control system for a calender which has three adjusting elements includes a pair of sensors positioned along either edge of the strip with a correction cycle being initiated whenever either sensor indicates a thickness value outside of established tolerance limits. The correction cycle includes a dead zone circuit for adjusting the tolerance limits, a precorrection delay time, a correction time and a pass line delay time. One of the measuring heads is time shared so that it scans to the center zone of the material and measures the center thickness. If, the center thickness indicates a variation from target value, when the edge thicknesses are within the tolerance limits, then a flatness or crown adjustment is made. Such a system requires two detectors, however, and does not provide a profile of the variations in thickness across the sheet width. Systems employing a single detector scanning across the material sheet have also been used. For these systems correction is made at one edge and, if a crown correction is included, at the center and then again at the far edge. Both systems tend to hunt about a correct value of thickness, rather than to maintain the material within the tolerance limits at all times. This hunting results from the sequential and independent nature of the corrections. A correction applied at one edge may result in a change at the other, which does not reach the measuring point until after the sensor has instituted a correction at this second edge. Such an over correction may then result in a series of corrections. With a crown adjustment, such as cross axis control this problem becomes even worse.

BRIEF SUMMARY OF THE INVENTION

Broadly speaking, the process controller of this invention employs a single sensing head, such as a beta gauge head, to scan rapidly in a transverse direction across a material sheet, the thickness of which is being controlled by the spacing between calender rolls. The transverse position of the sensor is controlled by a position controlling device, which operates a motor to drive the sensor head across the sheet at a specific speed and causes it to dwell for controlled periods at either edge before performing a return scan. The output from the sensor is supplied to circuitry which computes the average value of the deviation of this signal from a target value for specific zones across the width of the sheet, typically a left edge zone, a center zone and a right edge zone. As the sensing head completes its scan across one of these zones, the average value is computed and stored in a sample and hold circuit until the average has been computed and stored for each of the three zones.

When the average has been obtained for all three zones, the sensing head is at one edge of the sheet, and, at this point, all three signals are used to compute appropriate correction signals for operating the edge screw-down adjustments and the center adjustment, the latter being generally of the roll-bending or cross axis type. These correction signals for controlling the adjustments, are computed such that they take into account the average value for the other two zones, thereby eliminating much of the error existing in previous systems due to interaction of the adjustments. After the correction signals have been computed, they may be applied either simultaneously to all three adjustment elements or sequentially, provided that a relatively rapid sequence is achieved. In addition to the average and control signal computing circuitry, the system will generally include timing provisions to insure that the pass line delay does not result in over correction of the material and this is usually accomplished by inhibiting the measuring operation for one pass line delay after a correction is instituted. During this delay, the position controller is operated to maintain the sensor at the edge of the sheet.

DESCRIPTION OF PREFERRED EMBODIMENTS

Figure 1:
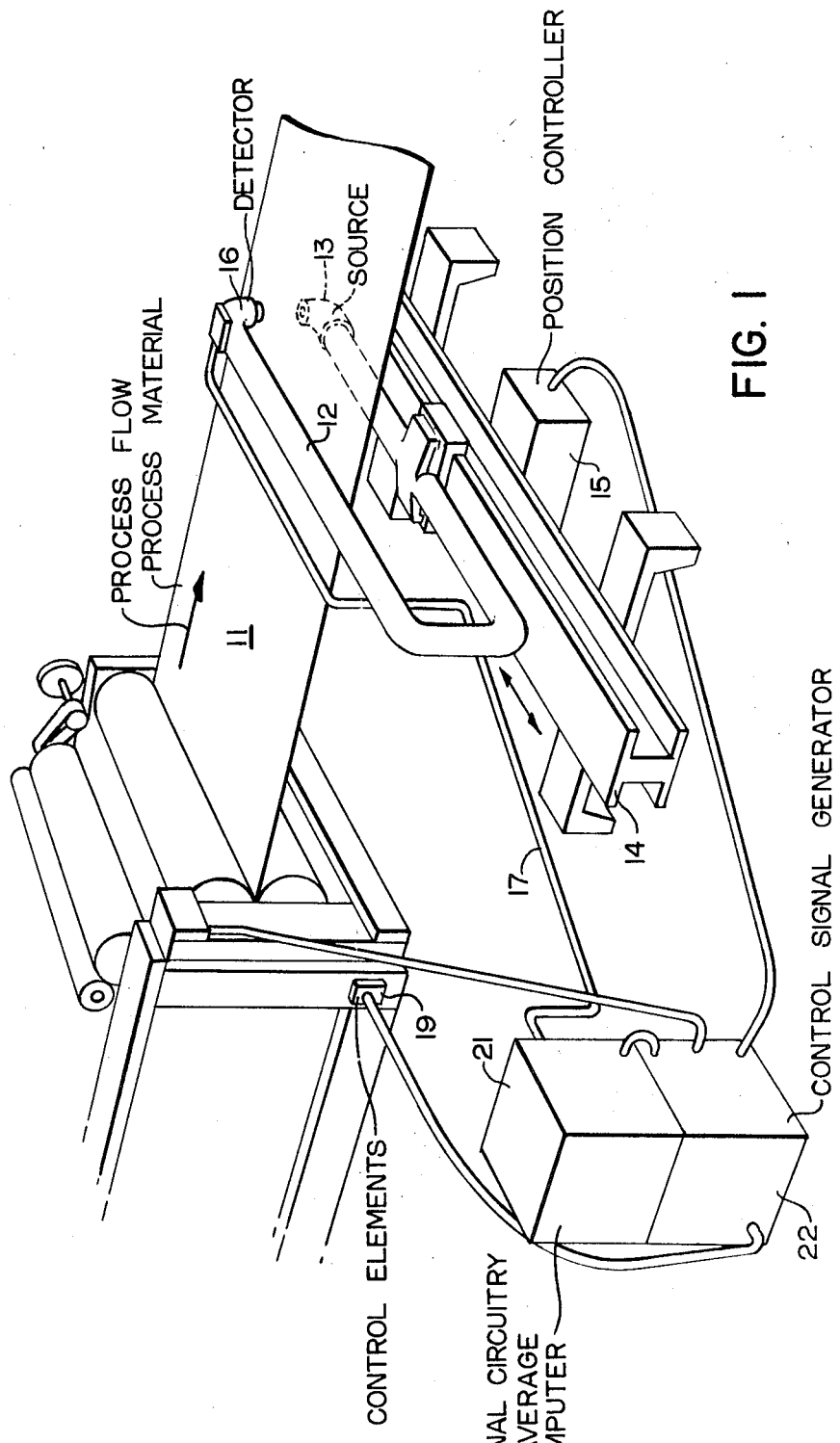
FIG. 1 is an illustration in perspective view of a process control system constructed in accordance with the principles of this invention.

With reference now to FIG. 1, there is illustrated a process control system suitable for use in the practice of this invention. The process material 11 flows through the jaws of a transducer 12, the transducer typically being a radiation thickness gauge in which radioactive emanations from source 13 pass through the process material 11 to the detector 16, which provides an output voltage proportional to the quantity of radiation received from the detector. Since, for a given process material, the quantity of radiation absorbed is a function of the thickness of the material, then variations in this thickness will result in variations in the output signal from detector 16. This output signal is supplied through cable 17 to an electronic unit designated as signal circuitry and average computer 21. The transducer 12 is slidably mounted on a beam 14 extending transversely across the line of direction of the process flow and the position of the transducer 12 on the material sheet 11 is controlled by a position controller unit 15. The position controller includes a motor for driving the transducer 12 transversely across the sheet and circuitry of a conventional type which provides an output indication of the transverse position of the detector 16 and further includes program circuitry for determining the time between transverse scans across the process strip 11. An electrical signal from this position controller 15 is supplied back to the control signal generator 22 and from it to the average computer 21.

The signal from the radiation detector 16 is supplied to the signal circuitry and average computer 21. This circuitry performs a number of functions. It generates a basic signal which represents deviation of the detector 16 signal from a target or "set point" value. The signal circuitry is often used to generate a display of the variations in thickness as a function of position across the strip and this may be done by a display on a strip chart recorder (not shown). The average computer performs the function of obtaining an average value of the deviations in thickness of the material for specific portions of the transverse scan. Alternatively, the circuit may obtain an average value of the thickness for specific portions and generate an output signal representing the difference between this average value and a target average value.

One type of position controller provides an output voltage which increases linearly as the detector head scans one edge to the other. By including in the position controlling circuitry voltage discrimination circuits, output signals may be supplied to the average computer as the detector head reaches precisely defined transverse positions (Zone limits). These position signals may then be used to control the average computing circuitry so that the average value of the deviation signal for a particular portion of the strip may be obtained. In the present invention, the average values of the left-hand third, the center third, and the right-hand third of the process material strips are computed. Other position controllers may utilize a series of microswitches to indicate the zones.

The average values from the signal circuitry and average computer 21 are supplied to the control signal generator 22 which performs the function of applying correction signals to the adjusting control elements 19. In the calendering process, these adjustment elements take the form of two-edge controls and a center control. The edge controls are usually screwdown motors which operate in two directions to increase or decrease the nip spacing between the rolls. These edge screwdown motors are operated independently and thus control not only the spacing between the rolls but can provide for a variation in thickness from one edge to the other. As earlier mentioned, in addition to these two adjusting elements, in most instances a third adjusting element is used to control the flatness or crown of the process material. This requires changing the thickness of the center of the sheet relative to the edge thickness. There are two general types of crown adjusting elements. A roll-bending adjusting element adjusts the crown by applying axial compression forces to one of the calender rolls, thereby bending it to vary the gap in the center of the strip with respect to the edges. The other type of crown adjusting element first varies the thickness at the edges, without changing the thickness at the center. This is a cross axis control in which the adjusting element pivots one calender roll horizontally with respect to the other, thereby increasing the lateral spacing between the rolls at the edges. In this arrangement, the thickness at the center is actually controlled by readjusting the position of the edge screw-down motors.

While there are a number of modes in which the process control elements may be operated, one suitable mode is referred to as proportional control. In this system the signal from the detector 16 is compared to a target value and the average value of the deviation between the signal and this set point value results in the development of a correction signal which is proportional to the magnitude of this deviation. This correction signal is used as the basis of developing a control signal to operate the appropriate control element.

In the present invention, the control signal generator 22 performs additional computational functions, which are critical to the maintenance of process material within preset tolerance levels. These computations involve the interrelationships between correction signals for the left and right-hand edges and the center. Therefore, in the process control system of this invention, the average deviation signal for each of the portions of the material strip 11 is stored until the detector 16 has completed a scan. At the completion of each scan the values of the average deviation in thickness for each portion are compared and correction or control signals for each of the control elements are developed based on the relative values of all three signals and, provided that these correction signals indicate a departure from set point beyond preset tolerance limits, referred to as dead zone limits, proportional control signals are developed to adjust the process control-adjusting elements. While, for a three element control system, three zones and three average signals are developed, for a system employing only two edge controls, only two transverse zones might be used.

Figure 2:
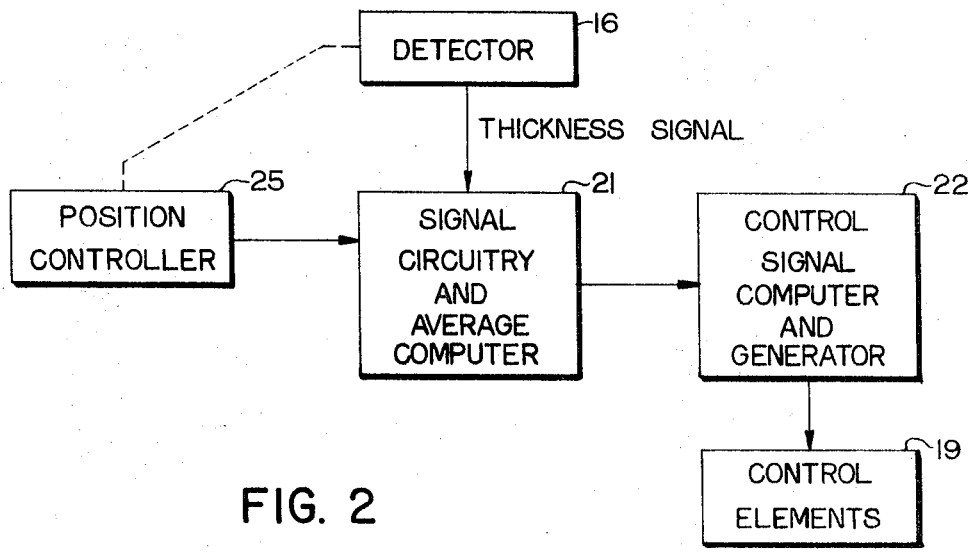
FIG. 2 is an illustration in block diagrammatic form of a process control system constructed in accordance with the principles of this invention.

In FIG. 2 there is illustrated in block diagrammatic form this control system. The detector 16, whose position is mechanically controlled by position controller 15, provides its output signal indicative of the thickness of the material to the signal circuitry and average computer 21. Position controller 15 supplies an electrical signal to the average computer and signal circuitry 21 and the output from this latter circuit is supplied to a control signal computer and generator 22 which provides electrical operating signals to control element 19. The signal circuitry and average computer 21 may take any of several forms, two particular forms being described in U.S. Pat. Nos. 3,067,939 and 3,191,015. In the average computer systems described in those patents, the average for a portion of a scan is computed by accumulating the average signal and then, on a switching signal, computing the average value. The time required for this computation and reset of the average computer is in the order of 1 to 2 seconds. A typical scan time across a process material sheet might be 20 seconds.

Thus the signals supplied from the signal circuitry and average computer 21 to the control signal generator 22 are a series of average values for deviations in thickness of different portions or zones of the process material strip 11.

Figure 3:
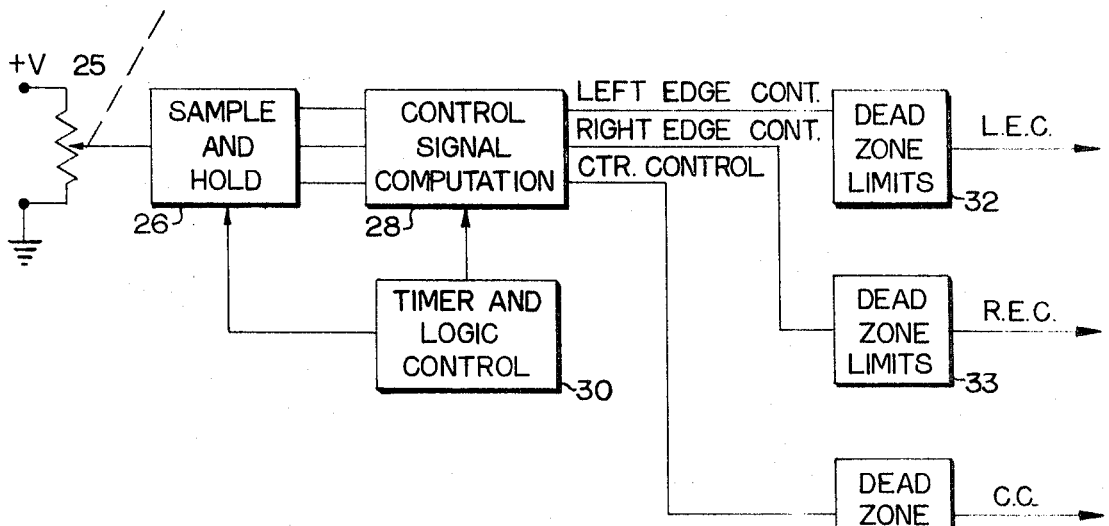
FIG. 3 is an illustration in block diagrammatic form of a specific portion of the circuitry for generating a control signal in accordance with the principles of this invention.

In FIG. 3 there is illustrated in more detail the logic of the control signal generator 22. The output signal from the average computer 21 would typically be in the form of a voltage signal from a slide wire potentiometer 25. This signal is supplied to sample and hold circuit 26. The sample and hold circuit 26, as will be described in more detail below, includes three sample and hold circuits which are operated to sample the computed average value for each portion of the strip and hold that value for a specific time until the control signals are computed. The sample and hold circuits provide three specific outputs to a control signal computation unit 28. The outputs are simply the average value of thickness deviation for the left-hand edge, the right-hand edge and the center as the detector scans across the process material.

The control signal computation circuit 28 and the sample and hold circuit 26 are each provided with timing signals from a timer and logic control unit 30. The timer and logic control unit 30 provides signals to the sample and hold unit 26 indicating when each computed average has been completed and therefore can be sampled. The timer and logic control unit 30 would generally be interrelated in its operation with the programming portion of the position control unit 15, so that scans of the detector 16 across the process material would not be initiated until at least one pass line delay had elapsed after the initiation of control action by signals from unit 28. The output signals from the control signal computation unit 28 are left-edge control signals and right-edge control signals, which are coupled through dead zone limits 32 and 33 to the left-edge screw-down motor and the right-edge screw-down motor. A center control signal from 28 is coupled through a dead zone 34 to a center control-adjusting element.

Figure 4:
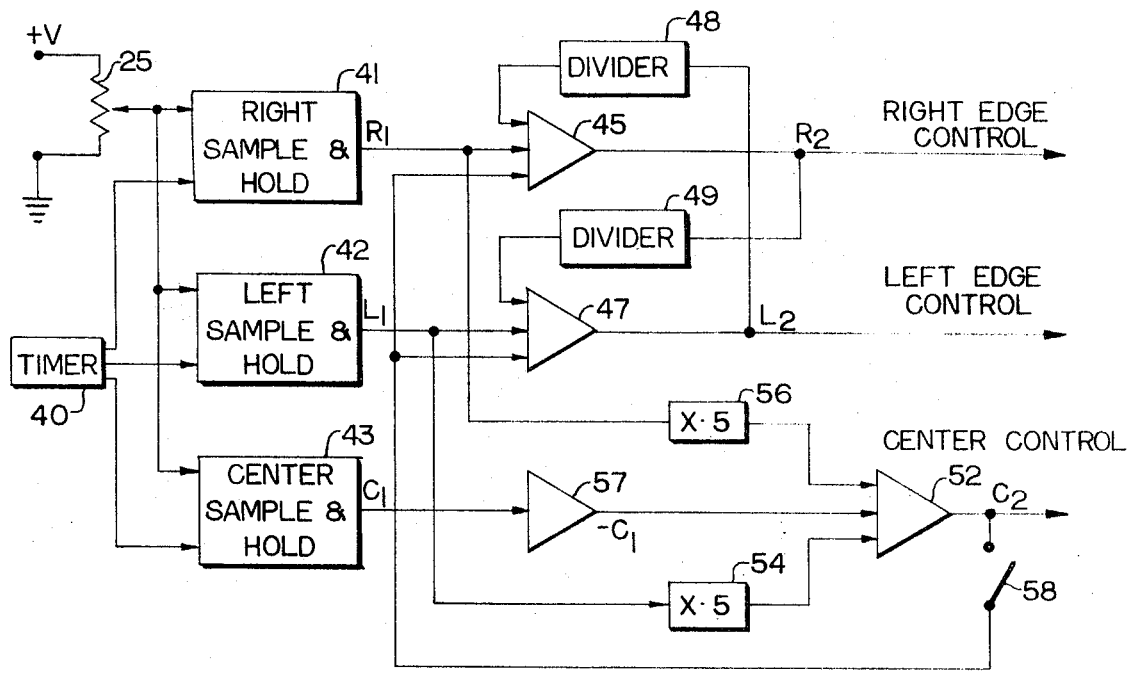
FIG. 4 is an illustration in block diagrammatic form of the circuitry for computing the control signals in accordance with the principles of this invention.

In FIG. 4 there is illustrated a specific configuration of sample and hold circuits and a control signal computation circuit for generating control signals which correct for the interaction between the edge controls and center controls. The circuit includes three sample and hold circuits 41, 42 and 43, each connected to the electrical output from the measuring circuit represented by potentiometer 25. The sample and hold circuits are formed of conventional circuit elements, such as operational amplifiers with a feedback capacitor, and the sampling function is controlled by timer pulses from a timer 40 which controls switches on the inputs to the operational amplifiers, so that, at the time when the average for a section has been computed, the signal from the average computer potentiometer 25 is connected directly to the appropriate one of the sample and hold circuits. The output from the right sample and hold circuit 41 is designated $R_1$ and is coupled as one input to an amplifier 45. Similarly, the output from the left sample and hold circuit 42 is designated as $L_1$ and is provided as one input to amplifier 47, while the output of the center sample and hold circuit 43 is designated $C_1$ and is provided as one input to a third amplifier 51. The second input to amplifier 45 is provided from the output $L_2$ of the amplifier 47 through a divider 48. Similarly the output $R_2$ of amplifier 45 is connected through a divider 49 as an additional input to amplifier 47. The output signal $C_1$ from the center sample and hold circuit 43 is coupled through amplifier 57 to an additional amplifier 52, so that the signal provided as an input to amplifier 52 is $-C_1$. The additional inputs to amplifier 52 are provided from $R_1$ and $L_1$ through attenuator circuits 56 and 54 which divide their input signals by one-half. The output signal $R_2$ from amplifier 45 serves as the right-edge control signal while the output signal $L_2$ from amplifier 47 serves as a left-edge control signal and the output signal $C_2$ from amplifier 52 is the center control signal. As indicated in connection with the description of the circuit in FIG. 3, these signals are applied through dead zone limits 32 and 34 which establish the tolerances of the material. These correction signals could be applied to the control elements through three independent control systems of the type described in U.S. Pat. No. 3,010,018.

In those instances where the flatness of the material sheet is controlled by a cross axis technique, the switch 58 is closed providing a feedback path from $C_2$ as additional inputs to amplifiers 45 and 47. Some roll-bending calenders may also require this feedback signal but it would be of the opposite polarity. The division factor included in dividers 48 and 49 is adjusted experimentally and will depend upon the precise arrangement of the edge control adjustment for the particular calenders. Usually this will vary from 0 to 0.25. This factor compensates in a weighted fashion for the change in sheet thickness on the right edge because of control adjustments of the left-edge screw-down motor and vice versa.

A mathematical expression for the configuration of the control computation circuit shown in FIG. 4 is set forth below. If the output from amplifier 45 is designated as $R_2$, then, $$-R_2 = R_1 + XL_2,$$

and $$-R_2 = R_1 - X(L_1 + YR_2),$$

where $R_2$ is the output signal from the right sample and hold circuit 41, $L_1$ is the output signal from the left sample and hold circuit 42, $x$ is the division factor for the divider 48, and $y$ is the division factor for the divider 49.

$-R_2$ can then be expressed as, $\dfrac{R_1 - xL_1}{1 - xy}$

Similarly, $$-L_2 = \frac{L_1 - yR_1}{1 - xy}$$

The control signal $C_2$ for the center sample and hold is expressed as, $$C_2 = C_1 - \left[\frac{R_1 + L_1}{2}\right]$$

The above equations express the appropriate control signals for a roll-bending control system. Where cross axis control is used, switch 58 is closed and the right-edge control signal $R_2$ is expressed mathematically on the following basis:

$$-R_2 = \frac{R_1 - xL_1 + C_2(1-x)}{1 - xy}$$

The left-edge control signal $L_2$ may be computed on the basis, $$-L_2 = \frac{L_1 - yR_1 + C_2(1-y)}{1 - xy}$$

Figure 5:
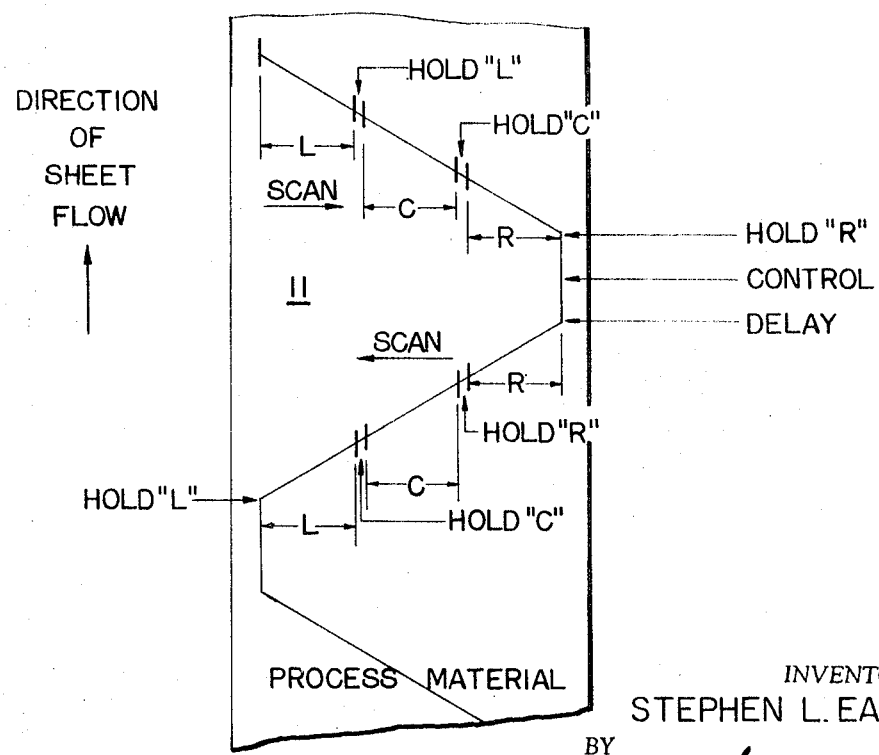
FIG. 5 is an illustration generally in diagrammatic form of the functions performed at various positions on the material sheet being produced in a process controlled in accordance with the principles of this invention.

In FIG. 5, the sequence of functions as the detector is scanned across the material strip 11 is illustrated. The first third on the left-hand edge is the left-edge zone, L and, while the detector is scanning over this portion, the information for computation of the average value for the left edge is being accumulated. At the end of this interval the average computer computes the average value of the signal for L and stores this value in the sample and hold circuit. During the next interval C, the data for C is being accumulated and, at the conclusion of this portion of the scan, the average value for the center portion is computed and stored in the sample and hold circuit. In the last portion R, the data for the computation of the average value of signal for portion R is accumulated and at the right-hand edge of the sheet, this value is computed and entered in the right-hand sample and hold circuit.

The position controller 15 is programmed to have the detector dwell at the edge while the control signals are applied either simultaneously or in sequence to the control elements. While, in the ideal sense, simultaneous application of all three signals is desired, an application to each of the controls in sequence is also acceptable. Conventional switching elements may be used to supply the signals to the controls once all three signals have been computed. After the control adjustments have been made, the detector continues to dwell at the right-hand edge for a delay period equal to the pass line delay so that the effects of these corrections are included in the material passing under the detector for the next scan which would proceed from the right-hand to the left-hand edge. Again in this scan the operation would be similar but in reverse sequence to the previous scan and, at the completion of the scan, the detector would swell at the left-hand edge, again performing any necessary corrections. The system may be arranged so that if there are no control adjustments required at the end of a scan, there would be no pass line delay and the detector could start the reverse scan immediately.

Having described the invention, various modifications and improvements will occur to those skilled in the art and the invention should be construed as limited only by the spirit and scope of the appended claims.

I claim:

1. A process control apparatus for use in a process for producing sheet material wherein the thickness of the sheet material is varied by adjusting the spacing between calender rolls through adjustment of three separate adjusting elements, one on the left edge of said sheet, a second on the right edge of said sheet, and a third cross axis adjusting element for varying the flatness across said sheet, comprising, a sensor for detecting the thickness of the process sheet adjacent to said sensor and producing an output electrical signal indicative of said thickness, means for scanning said sensor transversely across said sheet at a position downstream from said calender rolls, first signal-generating means coupled to the output of said sensor for generating a first measurement signal related to the average value of thickness over a first transverse portion at one edge of said sheet and for generating a second measurement signal relating to the average value of thickness of a second transverse portion at the other edge of said sheet and for generating a third measurement signal related to the average value of thickness of a third transverse portion at the center of said sheet, second signal-generating means responsive to said first, second and third measurement signals for storing said first, second and third signals until the completion of each transverse scan and for generating a first control signal for controlling the right edge adjusting element, a second control signal for adjusting the left edge adjusting element, and a third control signal for adjusting the cross axis adjusting element, said first control signal being computed on the basis of $$\left[-R_2 = \frac{R_1 - xL_1}{1-xy} + C_2\right], \quad -R_2 = \frac{R_1 - xL_1 + C_2(1-x)}{1-xy}$$

where
$R_2$ = the 1st control signal
$R_1$ = the 1st measurement signal
$L_1$ = the 2nd measurement signal
$x$ = a first proportional constant
$y$ = a second proportional constant
$C_2$ = the third control signal and the second control signal is computed on the basis of $$\left[-L_2 = \frac{L_1 - yR_1}{1-xy} + C_2\right], \quad -L_2 = \frac{L_1 - yR_1 + C_2(1-y)}{1-xy},$$

and wherein said third control signal is computed on the basis of $$C_2 = C_1 - \left[\frac{R_1 + L_1}{2}\right]$$

where $C_1$ = the 3rd measurement signal.

2. A process control apparatus for use in a process for producing sheet material wherein the thickness of the sheet material is varied by adjusting the spacing between calender rolls through adjustment of three separate adjusting elements, one on the left edge of said sheet, a second on the right edge of said sheet, and a third varying the flatness across said sheet comprising, a sensor for detecting the thickness of the process sheet adjacent to said sensor and providing an output electrical signal indicative of said thickness, means for scanning said sensor transversely across said sheet at a position downstream from said calender rolls, first signal generating means coupled to the output of said sensor for generating a first measurement signal related to the average value of thickness over a first transverse portion at one edge of said sheet and for generating a second measurement signal related to the average value of thickness of a second transverse portion at the other edge of said sheet and for generating a third measurement signal related to the average value of thickness of a third transverse portion at the center of said sheets, second signal-generating means responsive to said first, second and third measurement signals for storing said first, second and third signals until the completion of each transverse scan and for generating a first control signal for controlling the right edge adjusting element, a second control signal for adjusting the left edge adjusting element, and a third control signal for adjusting the flatness adjusting element, the magnitude and polarity of each of said first and second control signals being computed only from the values of both said first and said second measurement signals, the magnitude and polarity of said third control signal being computed from the values of said first, second and third measurement signals, and wherein said first control signal is computed as $$-R_2 = \frac{R_1 - xL_1}{1-xy}$$

where
$R_2$ = the 1st control control signal
$R_1$ = the 1st measurement signal
$L_1$ = the 2nd measurement signal
$x$ = a first proportional constant $y$ = a second proportional constant and said second control signal is computed as $$-L_2 = \frac{L_1 - yR_1}{1-xy}$$

where $L_2$ = second control signal and said third control signal is computed as $$C_2 = C_1 - \left[\frac{R_1 + L_1}{2}\right]$$

where $C_1$ = the 3rd measurement signal.

UNITED STATES PATENT OFFICE
CERTIFICATE OF CORRECTION

Patent No. 3,599,288  Dated August 17, 1971

Inventor(s) Stephen L. Eakman

It is certified that error appears in the above-identified patent and that said Letters Patent are hereby corrected as shown below:

Column 6, line 26 reading

"where $R_2$ is the output signal from the right sample and hold"

should read

--where $R_1$ is the output signal from the right sample and hold--

Signed and sealed this 7th day of March 1972.

(SEAL)
Attest:

EDWARD M. FLETCHER, JR.
Attesting Officer

ROBERT GOTTSCHALK
Commissioner of Patents